United States Patent [19]

Regehr et al.

[11] Patent Number: 4,467,448
[45] Date of Patent: Aug. 21, 1984

[54] IMAGE ROTATE CONTROL CIRCUITRY

[75] Inventors: John L. Regehr, Stewartville; Lee A. Sendelbach, Rochester, both of Minn.

[73] Assignee: International Business Machines Corporation, Armonk, N.Y.

[21] Appl. No.: 327,307

[22] Filed: Dec. 4, 1981

[51] Int. Cl.³ ............... G01D 9/00; G06F 15/00
[52] U.S. Cl. ....................... 364/900; 364/200
[58] Field of Search ............ 346/76 PH, 75, 35; 358/296, 298, 280, 263, 250; 364/900, 200; 340/711, 789, 717, 720, 723, 789; 382/44

[56] References Cited

U.S. PATENT DOCUMENTS

| | | | |
|---|---|---|---|
| 3,918,041 | 11/1975 | Mao | 340/789 |
| 3,924,225 | 12/1975 | Langnickel | 340/789 |
| 3,976,982 | 8/1976 | Eiselen | 382/44 |
| 4,084,195 | 4/1978 | Pereira | 358/280 |
| 4,158,203 | 6/1979 | Johnson, Jr. et al. | 346/35 |
| 4,287,521 | 9/1981 | Hakoyama | 346/35 |
| 4,334,231 | 6/1982 | Regehr | 346/76 PH |

Primary Examiner—Joseph F. Ruggiero
Assistant Examiner—Jameson Lee
Attorney, Agent, or Firm—J. Michael Anglin

[57] ABSTRACT

Image rotate control circuitry buffers one column of display or video data which is subsequently printed along a horizontal print line. A video dot counter cycles each horizontal scan line while a print line counter cycles each vertical scan. Video data is entered into the buffer when the count in the video dot counter equals the count in the print line counter. After one refresh of the display the buffer contains one print line of data. This data is shifted from the buffer to the printer during the vertical retrace or vertical blank period of the display. The control circuitry sends a strobe signal to the printer for the print operation as a new column of data is being buffered during the next refresh of the display.

6 Claims, 5 Drawing Figures

4,467,448

IMAGE ROTATE CONTROL CIRCUITRY

TECHNICAL FIELD

This invention relates to image rotate control circuitry for rotating image display data and transferring the rotated data to a printer as a horizontal print line of data.

The present invention finds particular utility in a display copier system where displayed data is copied by a printer and particularly where the printer is operating in synchronism with the display.

BACKGROUND ART

Rotation of print data is well known in the art. The reason for rotating the print data is generally to enable printing a longer character line than is possible if the print line is not rotated; i.e., the width of the paper in the printer is fixed whereas its length is variable, particularly when using a roll of paper or continuous forms.

Rotation of print data is also well known in systems where the image data to be printed is serial and the printer has a plural element print head for printing data in parallel along a horizontal print line. Such a system is described in U.S. Pat. No. 4,084,195 for Image Data Remapping System to L. W. Pereira. In that system; however, it is necessary to buffer the entire image and thereafter strips of the image are successively removed and stored in a horizontal strip buffer. Rotation is accomplished as alternate bytes within a given byte column are transferred from the horizontal strip buffer into one of a pair of vertical strip buffers. The alternate bytes are removed from the horizontal strip buffer in groups which are stored in registers within the rotator. In the present invention a single random access buffer is used to store a column of image data. The column of image data, of course, does not exceed the length of the horizontal print line. There is no need to buffer the entire display image and remap as in the prior art. Column one of the display is printed as horizontal line one and this process repeats until all columns of the display are printed as horizontal lines. For further simplicity the printer is strobed by and receives clocks from the display whereby it operates in synchronism with the display but at its refresh rate. That is for each full image display, one horizontal line of printing is developed and transferred to the printer during vertical blanking and then a new horizontal line of printing is developed during refresh. The image is successively refreshed until all columns of image data have been printed as horizontal rows. Other prior art for manipulating image data by 90° rotation but having the need to buffer the entire image includes U.S. Pat. No. 3,924,225 for Character Display Dot Raster Signal Generator Provided With Character Memory to W. Langnickel and 3,976,982 for Apparatus For Image Manipulation to E. Eiselen.

DISCLOSURE OF THE INVENTION

A column of image data is stored in a buffer and then transferred serially from the buffer during vertical blanking using a divided video dot rate signal to clock the buffer to perform the transfer. Printing of a horizontal line takes place as the printer is strobed with a signal generated relative to the vertical sync signal. During the next refresh of the image another column of image data is stored and transferred to the printer. The process repeats until all columns of the image have been stored and transferred to the printer.

DESCRIPTION OF THE INVENTION

Figure 1:
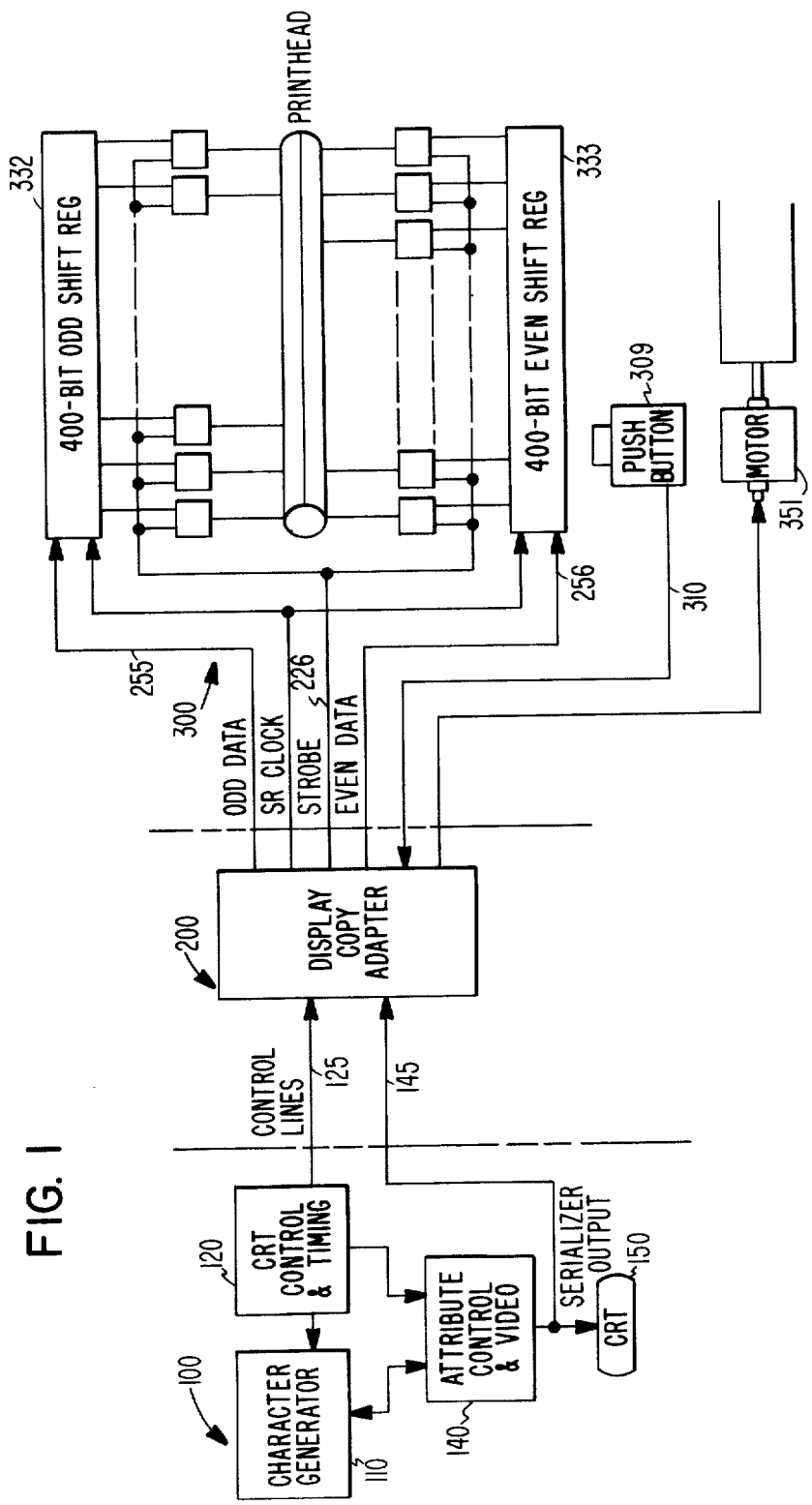
FIG. 1 is a schematic diagram illustrating an image display copier system incorporating the present invention.

With reference to the drawings and particularly to FIG. 1 the invention is illustrated by way of example as being incorporated in a display copier system shown and described in commonly assigned co-pending U.S. patent application Ser. No. 144,499 by J. Regehr filed Apr. 28, 1980. The display copier system of FIG. 1 includes a display 100, an adapter 200 and a printer 300. Display 100 includes character generator 110, CRT control and timing 120, attribute control and video 140 and cathode ray tube (CRT) 150. The video data displayed by CRT 150 which is received from attribute control and video 140 is also applied to adapter 200 via line 145. CRT control and timing 120 provides timing and control signals to adapter 200 via control lines 125. Control lines 125 include a dot clock line 126, FIG. 2b, a vertical sync line 127 and a horizontal sync line 128.

Adapter 200, FIG. 1, in addition to receiving inputs from display 100 also receives an input from printer 300. This input is in the form of a print switch signal on line 310. Printer 300 is substantially the same as the printer set forth in the referenced U.S. patent application Ser. No. 144,499. The display 100, however, has more dots in a horizontal scan line than the printer 300 has print elements in the print head. The number of horizontal scan lines in display 100, however, is less than the number of print elements in the print head of printer 300. Thus it is possible to use printer 300 as a display copier printer for display 100 by rotating the image data 90°.

Figure 2A:
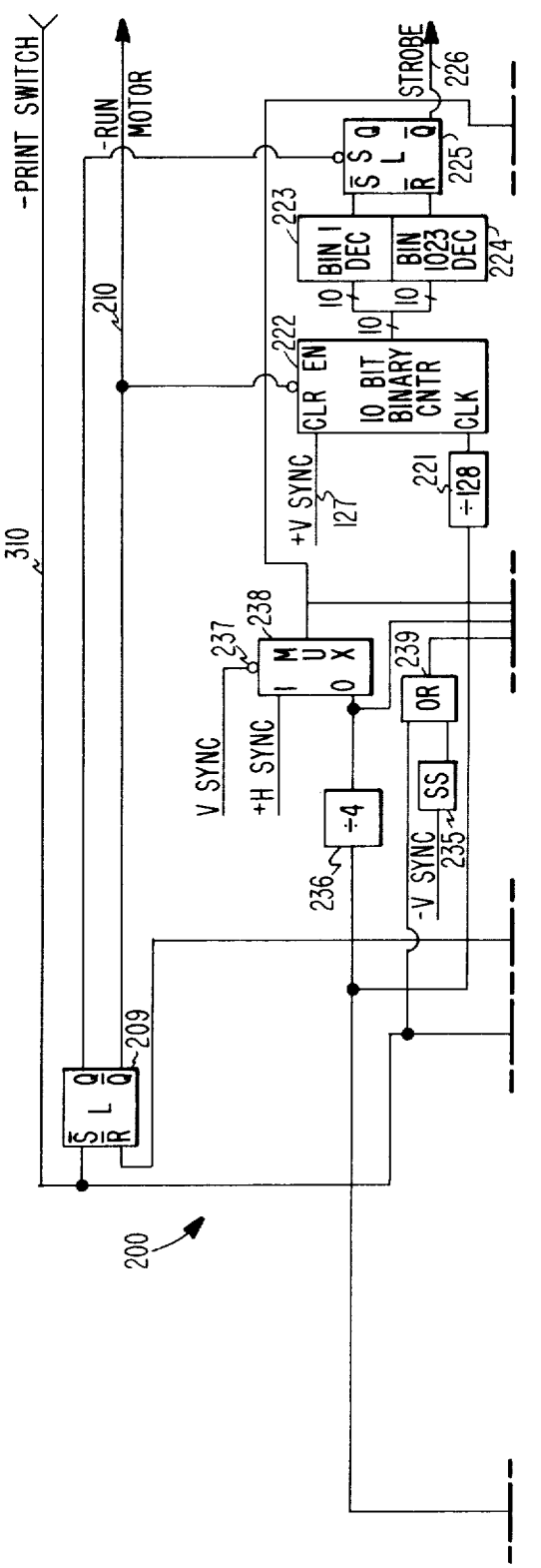
FIGS. 2a and 2b with FIG. 2a disposed above FIG. 2b taken together are a schematic diagram illustrating the adapter shown in block form in FIG. 1.
Figure 2B:
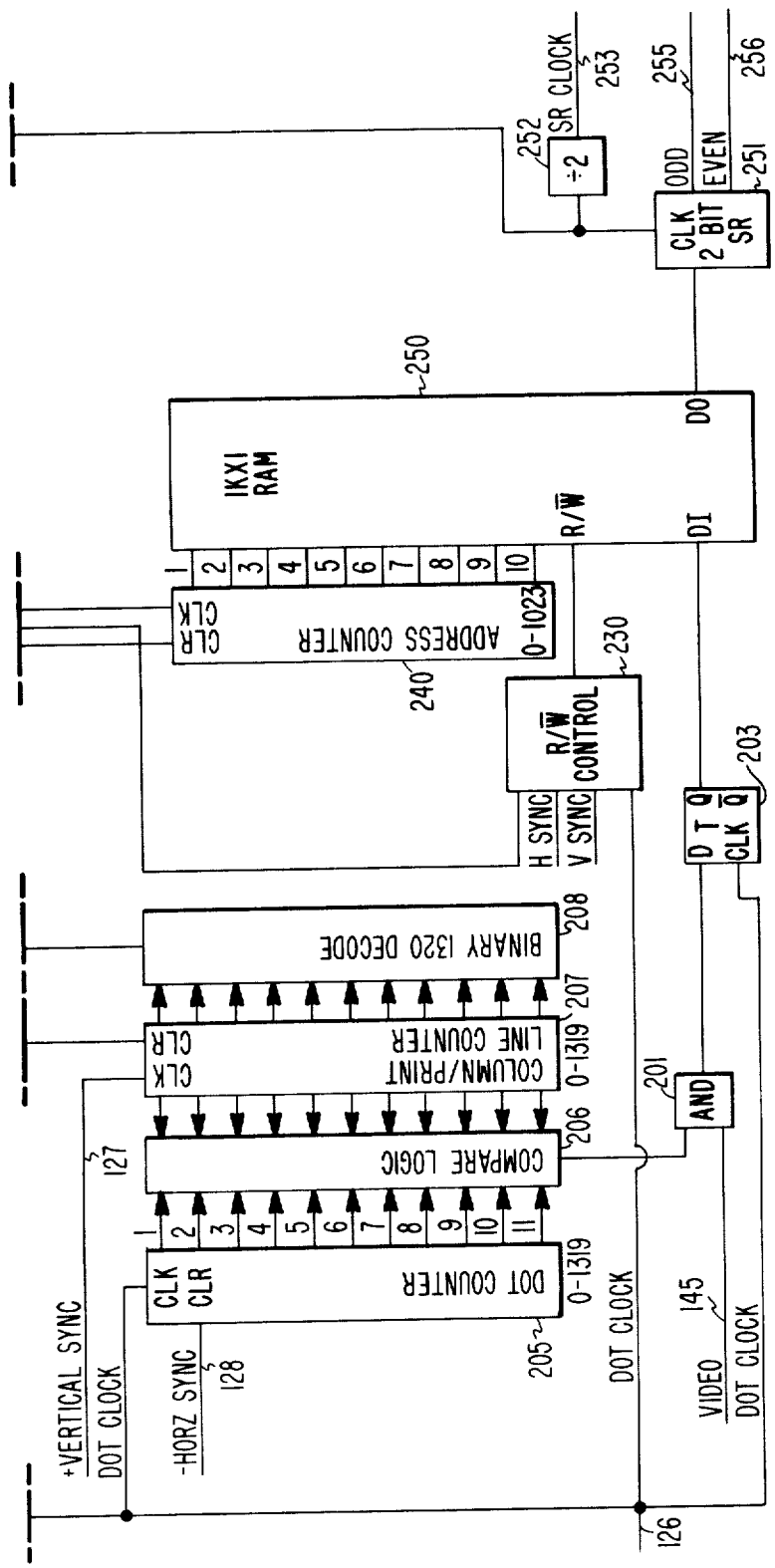
Figure 4:
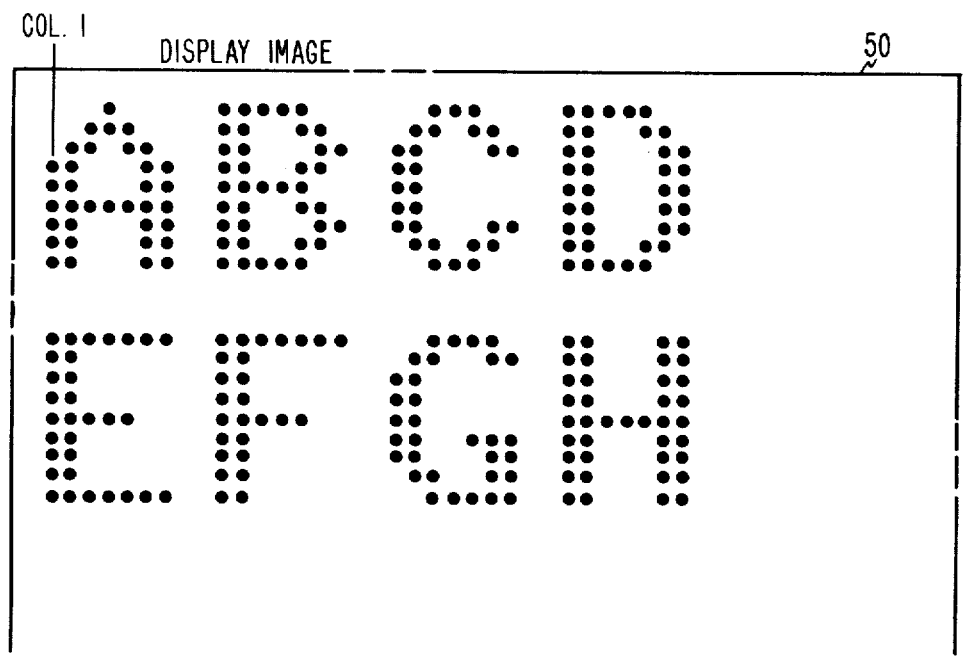
FIG. 4 is a diagram illustrating the display image and the printed output.
Figure 4:
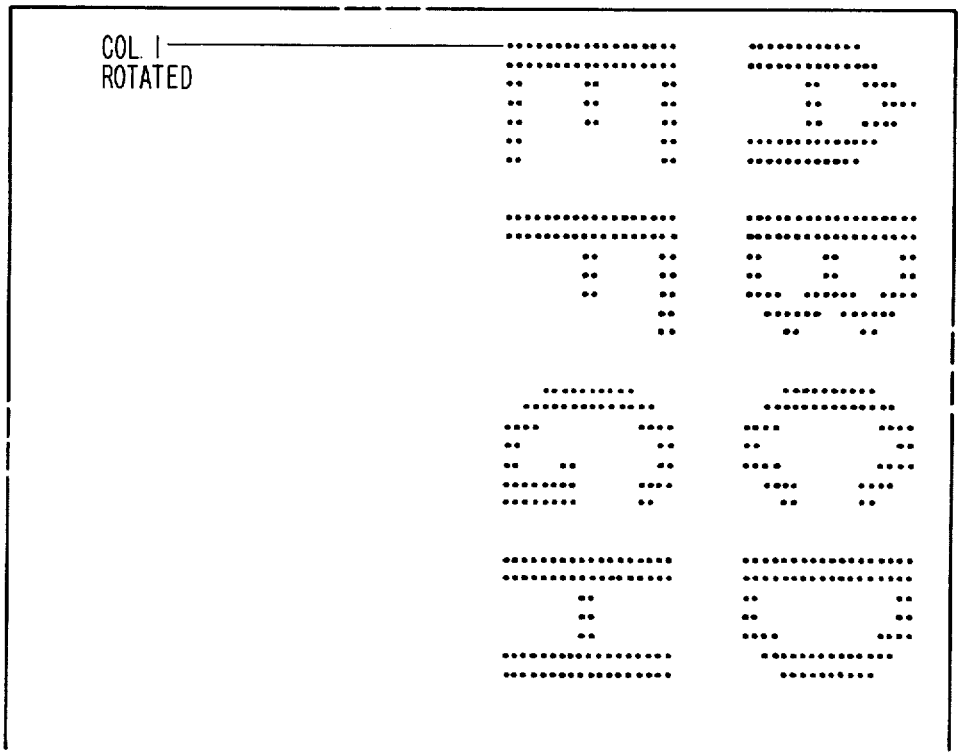

Adapter 200 rotates the image data 90° by buffering a column of display or image data in random access storage 250, FIG. 2b. The video data which is displayed by CRT 150 as illustrated in FIG. 4 is in serial form on line 145 which is applied to AND circuit 201 in adapter 200, FIGS. 2a and 2b. AND circuit 201 is conditioned by the output of compare logic 206 which compares the count value in dot counter 205 with the count value in print line or column counter 207. Print line counter 207 is clocked by the vertical sync signal on line 127 whereas dot counter 205 is clocked by the dot clock signal on line 126. The dot counter 205 is cleared by the horizontal sync signal on line 128 and the print line counter 207 is cleared by a print switch signal on line 310.

A print switch signal is generated whenever print switch 309, FIG. 1 is activated. Basically there is a single print switch signal for a document. In this particular example there are 1320 lines per document. Thus print line counter 207 is initially cleared by the print switch signal and then counts from zero to 1319 and then is cleared again by the next print switch signal on line 310. Dot counter 205 counts from zero to 1319 for every column of image data to be printed in a horizontal print line. When the value in dot counter 205 equals the value in print line counter 207 as determined by compare logic 206, AND circuit 201 is conditioned to pass the state of the serialized video data on line 145 to the data input of trigger 203. The output of trigger 203 feeds the data input of random access storage 250. Random access storage 250 is addressed by the contents of address counter 240. In this particular example, address counter 240 can address 1K of storage, however, only 400 lines are displayed on CRT 150 and therefore only 400 bits of storage are required because even though there are 1320 bits in a line, only one bit from each line; i.e., a column of data is stored. Storages, however, are usually commercially available in sizes other than 400 bits such as 1K of storage.

Address counter 240 is cleared by the print switch signal on line 310 or by the minus vertical sync (−V Sync) signal, these signals being applied to address counter 240 via OR circuit 239. The minus vertical sync signal is first applied to single shot multivibrator 235 whose output feeds OR circuit 239. Address counter 240 is clocked by the output of multiplexer 238 which has the vertical sync signal applied to its control input 237 which controls the passage of the plus horizontal sync signal when the control input is at a one level and the passage of the dot clock signal divided by four when the control input is at a zero level.

Random access storage 250 is either operating in a read or a write mode. The read and write modes are controlled by block 230 which receives the signal from the divide by four logic block 236. Read/write control block 230 also receives the horizontal and vertical sync signals as well as the dot clock signal. Data is written into storage 250 at the frequency of the horizontal sync signal. For example, dot counter 205 will count from zero to 1319 four hundred times; i.e., once for each horizontal scan line of the scan lines on display CRT 150. The value in print line counter 207 does not change until after 400 horizontal scans have been made. Thus there are 400 comparisons and AND circuit 201 is conditioned 400 times to pass the video data on line 145 for reading into storage 250.

After one vertical column of video data has been stored in storage 250 there is a vertical retrace or blanking of display 100 and then the display is refreshed. During the vertical retrace or blanking, data is read from storage 250 and transferred to shift registers 332 and 333 in printer 300, FIG. 1. The output of storage 250 is applied to a two bit shift register 251 which is clocked by the output of multiplexer 238. The output of multiplexer 238 is divided by two by logic block 252 to provide a shift register clock signal on line 253. Both the odd and even outputs from shift register 251 are sent to buffers 332 and 333 of printer 300 on lines 255 and 256 respectively. Printing then takes place under control of a strobe signal sent by adapter 200 on line 226 from latch 225.

Latch 225 is set and reset under control of a 10-bit binary counter 222 which is cleared by the plus vertical sync signal on line 127 and clocked by the output of divide by 128 circuit 221 which receives the dot clock signal as an input. Binary counter 222 is decoded by decodes 223 and 224 which feed the set and reset inputs of latch 225, respectively to generate the 5 ms strobe pulse on line 226.

As a horizontal line is being printed by printer 300 the next line to be printed is being collected and stored in storage 250 in the manner previously described but with print line counter having been advanced by the vertical sync signal. Thus the next column of image data is stored by storage 250. In this particular example there are 1320 columns to be printed as horizontal lines. Thus when print line counter 207 reaches 1319 as determined by binary decode 208, 1320 lines will have been printed and latch 209 which had been set by the print switch signal on line 310 will be reset to cause motor 351 in printer 300 to stop. Latch 209 provides a minus run motor signal on line 210 to motor 351, FIG. 1.

Figure 3:
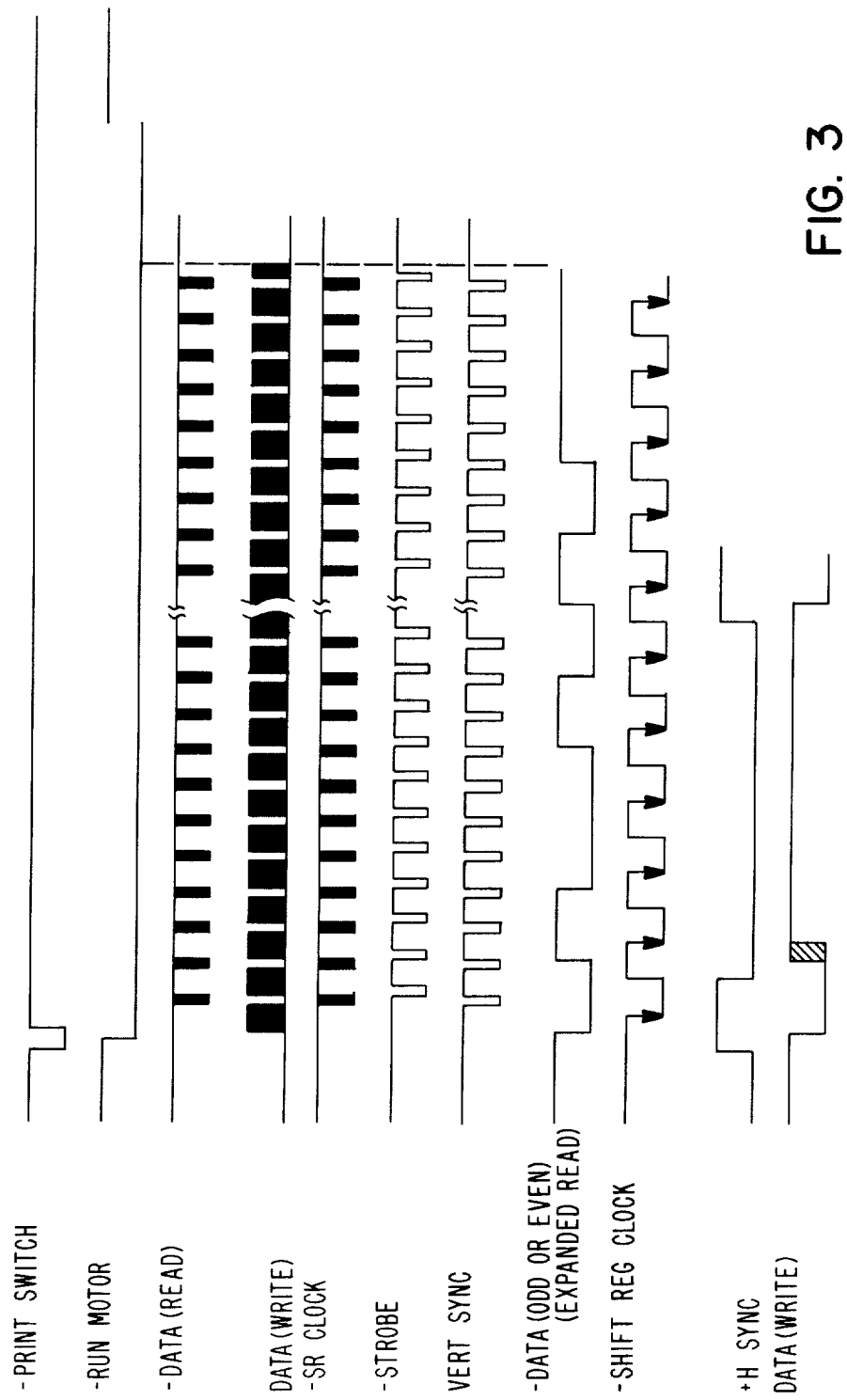
FIG. 3 is a timing diagram.

The print switch and run motor signals are shown in FIG. 3. In FIG. 3 it is seen that there are 1320 lines of data (READ) sent to the printer 300 and each line of data contains 400 bits. The data line and shift register clock are each shown on two different scales. On one scale the single heavy lines represents the entire 400 bits and shift register clock. The other scale partially shows the individual bits and individual shift register clock pulses. Data is read from storage 250 much faster than when it is written therein. This is because only one video dot is written into storage for each horizontal scan during the collection of a column of video dots or data bits. The horizontal sync signal is also shown on a different scale. The video dot or data bit is written into storage 250 during the time data (write) is up; i.e., during minus horizontal sync, and the specific time depends upon which column is being collected. The strobe signal occurs once for each line printed and during the first part of each refresh which is controlled by the vertical sync signal.

We claim:

1. Rotate control circuitry for a display copier system including display means for repetitively displaying data in a plurality of lines of video dots, with a retrace following each repetition, and a printer having a plurality of elements for printing said data along a horizontal print line, said printer having a number of print elements at least as great as the number of said lines of video dots, comprising:
   a read/write buffer having a capacity for storing a column of said data;
   buffer write means for writing a column of said data into said buffer one bit at a time corresponding to a video dot in each horizontal line of said video dots as said data is being displayed,
   buffer read means for reading said column of data from said buffer as said display means is retracing; and means for transferring said column of data read from said buffer to said printer for printing said column of data along said horizontal print line.

2. The rotate control circuitry of claim 1 where said buffer write means further includes:
   a dot counter clocked at the video dot rate and cleared after each of said lines of dots;
   a column counter clocked once for each said retrace and cleared when the number of said retraces equals the number of said video dots in a line; and
   compare means for indicating when the value in said dot counter equals the value in said column counter, said buffer write means writing one bit into said buffer for each indication from said compare means.

3. In combination with a raster display device that generates serial video signals for displaying an image comprising a plurality of rows and columns of data bits, and for successively refreshing said plurality of rows of data bits as a plurality of horizontal scans followed by a vertical retrace interval, and repeating said successive refreshing each time the entire display image has been refreshed, said video signals including said data bits, dot-clock pulses for timing the display of said data bits with respect to said display image, horizontal retrace signals defining said horizontal scans, and vertical retrace signals defining vertical frames, a hard-copy printer having a single horizontal row of print elements disposed transversely across a print track and having means for advancing a print medium longitudinally along said track; an adapter for producing a rotated image of said display image on said print medium, said adapter comprising:

buffer means for storing a plurality of said data bits at least equal in number to the number of said rows;

timing means responsive to said video signals for establishing between each successive vertical frame a comparatively short vertical retrace interval;

first gating means responsive to said timing means during each successive vertical frame for transferring a data bit from each of said horizontal scans to said buffer while said each horizontal scan is refreshing a corresponding row of data bits, so as to enter a different column of said data bits into said buffer in each of said vertical frames; and second gating means responsive to said timing means during said vertical retrace interval for transferring a column of data bits just transferred to said buffer in an immediately preceding vertical time frame from said buffer to said horizontal row of print elements, so as to rotate the displayed image by 90° and to print it on the print medium column by column with respect to the original image.

4. The combination of claim 3, wherein said first gating means includes:

a dot counter clocked directly by said dot-clock pulses;

a column counter clocked by said vertical retrace signals; and a comparator coupled to both said dot counter and said column counter for producing a signal for transferring said one data bit.

5. The combination of claim 3, wherein said second gating means includes:

means for producing transfer pulses having a rate lower than that of said dot-clock pulses; and means responsive to said vertical retrace signals for gating said transfer pulses to said buffer during said vertical retrace interval.

6. The combination of claim 5 wherein said means for producing transfer pulses includes a divider responsive to said dot-clock pulses.

* * * * *